No. 674,251. Patented May 14, 1901.
T. H. ANDERSON.
AUTOMATIC TIRE INFLATING APPARATUS.
(Application filed July 7, 1900.)
(No Model.)

WITNESSES:
J. H. Webber
Sara Alexander.

INVENTOR:
T. H. Anderson,
BY E. T. Silvius,
ATTORNEY.

THE NORRIS PETERS CO., PHOTO-LITHO., WASHINGTON, D. C.

UNITED STATES PATENT OFFICE.

TILLMAN H. ANDERSON, OF INDIANAPOLIS, INDIANA.

AUTOMATIC TIRE-INFLATING APPARATUS.

SPECIFICATION forming part of Letters Patent No. 674,251, dated May 14, 1901.

Application filed July 7, 1900. Serial No. 22,813. (No model.)

*To all whom it may concern:*

Be it known that I, TILLMAN H. ANDERSON, a citizen of the United States, residing at Indianapolis, in the county of Marion and State of Indiana, have invented certain new and useful Improvements in Automatic Tire-Inflating Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to apparatus for automatically inflating pneumatic tires of the class that are employed on the wheels of bicycles and other vehicles, the object being to provide apparatus of this character which may either be formed integral with the tire or separately and applied thereto and which may be cheap and reliable and the valves and working parts of which may be readily accessible for examination, cleaning, or repairing, so as to be free from the trouble and expense inseparable from those devices having valves and the like within the tire.

The invention consists in providing an inflatable tire with a flexible bulb acting as a bellows attached at its outer sides to the interior of the tire, an exterior conduit connecting the bulb with the casing of an exterior valve having communication with the tire, and a check-valve closing an opening in the exterior conduit to the atmosphere, said parts being of new and novel form of construction; and the invention may further include a novel spring arranged within the bulb.

It consists also in the parts and combination and arrangement of parts hereinafter particularly described and claimed.

Figure 1:
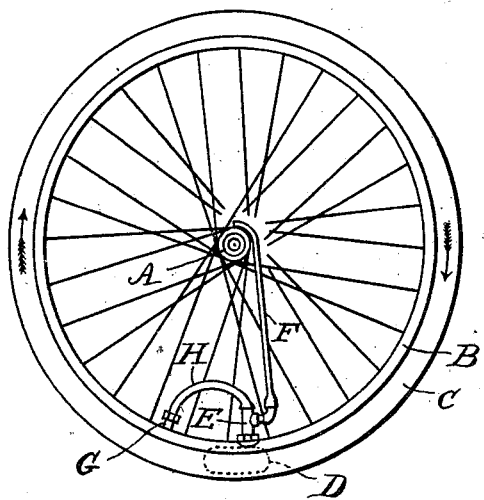
Figure 2:
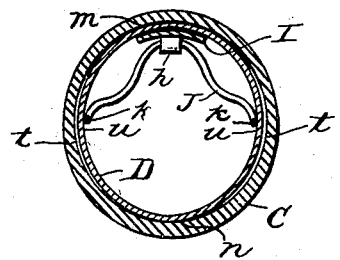
Figure 3:
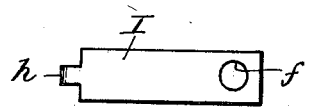
Figure 4:
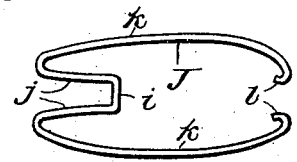

Referring to the drawings, Figure 1 represents a side elevation of a wheel to which my invention is applied; Fig. 2, a transverse sectional view of a tire and bulb on a line X X in Fig. 5; Fig. 3, a plan view of the head-plate for valve-nipple which also holds the bulb-spring in position; Fig. 4, a plan view of the bulb-spring, and Fig. 5 a longitudinal central sectional view of a portion of the wheel-rim or felly and the tire and the bulb and valves and connections.

Similar letters of reference in the several views designate like parts.

In the drawings, A designates a wheel-hub, B a wheel-rim or felly, C a "single-tube" inflatable tire, and for the purpose of illustration may represent the air-tube of a double-tube tire, D the bulb, E the receiving-valve for the conduit and bulb, F the air-inlet tube, which connects with the receiving-valve and extends to the hub A, where air may be drawn in with the least amount of dust, G the discharging-valve for the bulb and through which air may be admitted to the tire, as in usual practice, and H a conduit between the bulb and the discharging-valve, all of which may be of any suitable form of construction, except as may be hereinafter specified.

Figure 5:
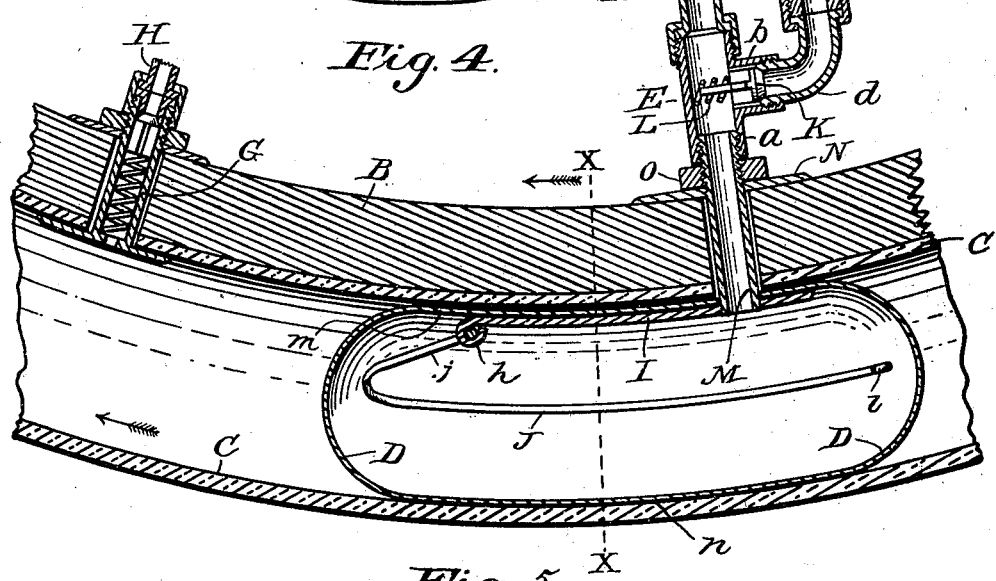

The bulb D is flexible and is oblong and approximately circular in cross-section and has ends of suitable form, such as semiglobular or conical. It is imperforate except near one end of the upper side, where air is admitted and expelled through a nipple M, which has a head-plate I secured thereto at the interior of the bulb, said plate pressing the upper side of the bulb and the adjacent wall of the tire against the wheel-rim B. The "upper side" is used to designate that part opposite the tread of the tire, as indicated in Fig. 5, where the section of felly is above the tire. The bulb, preferably only at the upper and lower sides, as at *m* and *n*, respectively, is secured, as by means of cement, to the adjacent portions of the inner surface of the tire, and the intermediate portions *u u* are preferably unattached at *t t*, so that the air may circulate about the exterior of the bulb. Any puncture-proof welt may be interposed between the bulb and tire at *n*, if desired. The plate I has an aperture *f* near one end thereof into which the nipple M is inserted and secured, and thus the nipple is situate near one end of the bulb, whereby an advantage is gained in expelling the air from the bulb, the wheel rotating in the direction indicated by the arrows on the tire.

The nipple M extends through a suitable aperture in the wheel-rim B to and beyond the upper or inner edge thereof and has an exterior screw-thread, on which is a binding-nut O, preferably seated against a washer N, resting on the surface of the rim. Adjacent the nut O the receiving-valve E is connected to the nipple M. This valve preferably consists of a T, one end of the barrel $a$ of which is screwed onto the nipple and in the branch $b$ of which is fitted the valve proper, K, seated by a spring L against a seat formed at the end of an elbow $d$, screwed into the branch opening. The air-inlet tube F is detachably coupled at one end to the elbow $d$ and has its opposite end curved and may be suitably attached to the hub A or to the wheel-spokes. The valve opens inward, so as to prevent the return of air outward from its case to the atmosphere. Connected to the valve E, so as to be in constant communication with the bulb, is a conduit H, either of flexible or of rigid construction, which is coupled to a valve G in communication with the interior of the air-chamber of the tire, and this latter valve may be of the form commonly employed in such situations, being suitably modified for connecting with the conduit H.

In some cases it may be desirable to guard against the sides $u\,u$ collapsing under certain conditions, as when too much surface may be unattached to the tire, and to prevent such collapse I provide a spring J, of spring-wire, which extends along the sides $u\,u$ within the bulb, as main arms $k\,k$, having return branches $j$ coupled integrally by a bar $i$, which is supported in an eye $h$, formed at one end of the plate I, the opposite ends $l$ of the arms $k$ being turned inwardly, so as to prevent chafing the bulb. The tension of the spring is such as to press the sides of the bulb toward the side walls of the tire, the eye $h$ preventing the dislodgment of the spring or any twisting thereof, but permitting the spring to approach the head-plate I when the tire may be only partially inflated. In some cases I may cement the bulb at all parts of its circumference to the tire, or I may form it integral with the tire, in which case I may dispense with the spring.

In practical use, the wheel being rolled, as usual in practice, the weight of the vehicle must cause the tire to press against the wheel-rim at the points of contact with the ground. When the bulb shall have passed such contact-point, it will expand and permit atmospheric air to enter through the valve E, (or past the valve proper, K,) and at the next and each succeeding contact the weight upon the bulb will cause the air therein to be injected through the conduit H and the valve G into the tire air-chamber, and this action being carried on repeatedly, the pressure produced in the tire being governed by the weight carried by the wheel. It will be observed that the longer imperforate end of the bulb should be compressed first, which has a tendency to increase the pressure in the conduit as the air is forced somewhat gradually into it, and thereby the air may more easily unseat the valve G, under which a partial reactionary vacuum has been formed—that is, there would be momentarily a less pressure at that point than that in the bulb and conduit.

Having thus described my invention, what I claim as new, and desire to secure by Letters Patent, is—

1. An automatic tire-inflating apparatus comprising an inflatable tire, an oblong bulb inclosed in the tire and attached thereto at two opposite sides thereof and unattached at two opposite sides thereof intermediate the attached sides, a conduit connected at one end thereof to the bulb near one end thereof, a head-plate provided with an eye and secured to the end of the conduit within the bulb, a spring connected with the eye and having two arms extending along the unattached sides of the bulb, a receiving-valve for the conduit, and an outlet-valve for the conduit communicating with the interior of the tire.

2. In a tire-inflating apparatus, the combination with the tire, of the oblong bulb inclosed in the tire and secured thereto and having the aperture for receiving and discharging air, a head-plate provided with an eye and having the aperture registering with said aperture in said bulb, the nipple extending through said aperture in said bulb and secured to said head-plate in said aperture therein, the conduit connected with said nipple, a receiving-valve for said conduit, an outlet-valve for said conduit communicating with the interior of the tire, and a spring connected with the eye in said plate and having two arms extending along the sides of said bulb intermediate the top and bottom thereof, substantially as set forth.

3. In a tire-inflating apparatus, the combination with the tire and the wheel-rim, of the oblong bulb inclosed in the tire and secured thereto and having the aperture near one end thereof for receiving and discharging air, the head-plate, the nipple attached to the head-plate, the valve-case attached to said nipple and having the side inlet, the valve in said side inlet, the pipe-duct connected to said valve-case and extending through the rim at a point beyond the opposite end of said bulb and communicating with the tire, and the outlet-valve for said duct, substantially as set forth.

In testimony whereof I affix my signature in presence of two witnesses.

TILLMAN H. ANDERSON.

Witnesses:
   WM. C. THOMPSON,
   E. T. SILVIUS.